US006470184B1

(12) United States Patent
Machida

(10) Patent No.: US 6,470,184 B1
(45) Date of Patent: Oct. 22, 2002

(54) MOBILE COMMUNICATION SYSTEM IN WHICH TRAFFICS ARE EQUALIZED

(75) Inventor: Atsushi Machida, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/385,022

(22) Filed: Aug. 30, 1999

(30) Foreign Application Priority Data

Sep. 11, 1998 (JP) .......................................... 10-258589
Sep. 14, 1998 (JP) .......................................... 10-260334

(51) Int. Cl.$^7$ ............................................... H04Q 7/20

(52) U.S. Cl. ..................... 455/453; 455/552; 455/439

(58) Field of Search ................................ 455/436, 438, 455/439, 442, 443, 452, 453, 454, 467, 434, 552, 553, 560, 561, 445; 370/331, 353, 354

(56) References Cited

U.S. PATENT DOCUMENTS

| | | | | |
|---|---|---|---|---|
| 4,670,899 A | * | 6/1987 | Brody et al. ................. | 455/436 |
| 4,790,000 A | * | 12/1988 | Kinoshita ..................... | 455/449 |
| 5,448,619 A | * | 9/1995 | Evans et al. ................. | 455/426 |
| 5,574,973 A | | 11/1996 | Borth et al. | |
| 5,682,380 A | * | 10/1997 | Park et al. .................... | 370/331 |
| 5,697,055 A | * | 12/1997 | Gilhousen et al. .......... | 455/436 |
| 5,722,073 A | * | 2/1998 | Wallstedt et al. ............ | 455/436 |
| 5,818,824 A | * | 10/1998 | Lu et al. ...................... | 370/328 |
| 5,850,607 A | * | 12/1998 | Muszynski ................... | 455/442 |
| 6,002,933 A | * | 12/1999 | Bender et al. ............... | 455/442 |
| 6,049,711 A | * | 4/2000 | Ben-Yehezkel et al. ..... | 455/414 |
| 6,081,713 A | * | 6/2000 | Desgagne .................... | 455/436 |
| 6,108,547 A | * | 8/2000 | Yamashita et al. .......... | 455/442 |
| 6,115,608 A | * | 9/2000 | Duran et al. ................. | 455/436 |
| 6,173,183 B1 | * | 1/2001 | Abu-Amara et al. ........ | 455/442 |
| 6,198,929 B1 | * | 3/2001 | Krishnamurthi et al. .... | 455/439 |
| 6,285,875 B1 | * | 9/2001 | Alajoki et al. ............... | 455/423 |

FOREIGN PATENT DOCUMENTS

| | | |
|---|---|---|
| EP | 0 595 786 A2 | 7/1988 |
| JP | 4-70094 | 3/1992 |
| JP | 5-75530 | 3/1993 |
| JP | 7-226973 | 8/1995 |
| JP | 8-70479 | 3/1996 |
| JP | 9-9340 | 1/1997 |
| JP | 10-65606 | 3/1998 |
| JP | 10-145834 | 5/1998 |
| WO | WO 96/12380 | 4/1996 |
| WO | WO 97/23110 | 6/1997 |
| WO | WO 97/41698 | 11/1997 |

OTHER PUBLICATIONS

European Search Report dated Nov. 7, 2000.
Switching Handovers in Microcellular Mobile Networks: An Architectural Evolution, Paul Simmons and Michel Mouly, Matra Communication, France, ISS '92, Oct. 1992, vol. 1., pp. 108–112.

* cited by examiner

Primary Examiner—Dwayne Bost
Assistant Examiner—Jean A. Gelin
(74) Attorney, Agent, or Firm—McGinn & Gibb, PLLC

(57) ABSTRACT

A mobile communication system includes first and second switching apparatuses, an information channel provided between the first and second switching apparatuses, a plurality of base stations managed by each of the first and second switching apparatuses, and a mobile station. The mobile station can communicate with the first switching apparatus through one of the plurality of base stations managed by the first switching apparatus and with the second switching apparatus through one of the plurality of base stations managed by the second switching apparatus. The first and second switching apparatuses detect traffics therethrough as first and second traffics, respectively, and the second switching apparatus notifies the second traffic to the first switching apparatus via the information channel. The first switching apparatus controls the mobile station and the second switching apparatus based on the first and second traffics such that the mobile station which is currently communicating with the first switching apparatus communicates with the second switching apparatus.

20 Claims, 5 Drawing Sheets

MOBILE COMMUNICATION SYSTEM IN WHICH TRAFFICS ARE EQUALIZED

BACKGROUND OF THE INVENTION

1. Field of the Invention

The present invention relates to a mobile communication system, and more particularly, to a mobile communication system in which traffics are equalized between switching apparatuses.

2. Description of the Related Art

Conventionally, various mobile telephone systems are known such as a PHS (personal handy phone system) in which a minimal cell method is adopted, an automobile telephone system in which a small cell method is used, and a PDS (portable digital phone system). Each of the mobile phone systems have a merit and a defect.

For example, in the PHS system, the area which a radio wave reaches has the radius about 100 m from a base station. Therefore, in order to form a wide service area, a lot of base stations are densely installed. As a result, there is a problem in that there is an area where the radio wave is difficult to be received, depending on the installed state of the base stations. On the other hand, there is an advantage in low communication charge in the PHS system, compared with the other mobile phone systems.

On the other hand, in the PDS system, because the small cell method is adopted such that the radio wave can reach to a relatively wide area, there is a low possibility of the above-mentioned problem that the radio wave is difficult to be received. However, there is a problem in a high communication charge in the PDS system, compared with the PHS system.

In order to eliminate such a conventional problem, a dual band portable phone is discussed in recent years to be possible to be applied to two mobile phone systems such as the PHS system and the PDS system. In the following description, an operation mode is referred to as a "PHS mode" when the dual band portable phone operates as a mobile station of the PHS system, and as a "PDS mode" when the dual band portable phone operates as the mobile station of the PDS system.

The switching of the operation mode in the dual band portable phone, i.e., the switching of the mobile communication system is conventionally carried out on the dual band portable phone. That is, a control unit of the dual band portable phone operates in the PHS mode when the dual band portable phone is in a service area of the PHS system and out of any service area of the PDS system. Oppositely, the operation mode of the dual band portable phone operates is automatically switched to the PDS mode when the dual band portable phone is out of any service area of the PHS system and in a service area of the PDS system. Also, the control unit of the dual band portable phone automatically switches the operation mode to be PHS mode with low communication charge, when the dual band portable phone is in an area which is covered by the PHS system and the PDS system.

Also, the dual band portable phone is possible to operate in either of the PHS mode or the PDS mode in response to the operation of a predetermined button by a user in addition to the automatic switching.

Conventionally, the mobile communication system to which the dual band portable phone belongs is selectively switched based on the control of the dual band portable phone itself, as mentioned above. In this case, the traffic of a base station of each mobile telephone system is not considered. Therefore, the dual band portable phone sometimes operates in the PHS mode with a large traffic quantity while the traffic of the PDS system is small. Or, the opposite situation occurs. As a result, there is a problem in degradation of communication quality due to traffic jam.

It should be noted that "a digital radio communication system and a digital radio communication apparatus" is disclosed in Japanese Laid Open Patent Application (JP-A-Heisei 10-65606) as the technique to improve the communication quality. In the reference, the communication system is composed of base stations A1 to C1 and terminal stations A2 to C2. Radio communications between the base station and the terminal station and between the base stations are carried out. In such a digital radio communication system, the base station selects a combination of the frequency with a smallest transmission error to noise around the base station and a convolution code, and communicates using the frequency and the convolution code of the selected combination.

In this way, an error correcting code used for the communication is appropriately selected in accordance with the radio wave situation around the communication environment. As a result, the deterioration of the communication quality which is caused by the transmission path error can be restrained because the transmission path error becomes little. However, in this digital radio communication system, it is not possible to prevent the deterioration of the communication quality which is caused by the large traffic.

In conjunction with the above description, a mobile communication system is described in Japanese Laid Open Patent Application (JP-A-Heisei 4-70094). In this reference, a service area is composed of a plurality of zones, in which base stations are respectively provided. A mobile station communicates with one of the base stations. When the mobile station moves to an adjacent area during the communication, the base station is switched to another base station for the adjacent area. Each base station has notifying means for notifying a control channel frequency information. of the other base station for the adjacent area and a channel operation percentage of the base station. The mobile station has monitoring means and a selecting means. The monitoring means monitors the channel operation percentage notified from each base station and reception levels from each base station. The selecting means selects one of the base stations which has the reception level higher than a predetermined value and the channel operation percentage lower than a predetermined value as a switching destination base station.

Also, a traffic distributing system in a mobile communication system is described in Japanese Laid Open Patent Application (JP-A-Heisei 5-75530). In the reference, a traffic distribution start threshold value T1, a traffic distribution stop threshold value T2, and a channel selection re-execution instruction transmission period $\tau$ are stored in a main control unit of a radio base station. When a communication channel usage percentage exceeds the traffic distribution start threshold value T1, the transmission of a channel selection re-execution instruction is started at the transmission period T$\tau$. When the communication channel usage percentage is decreased below the traffic distribution stop threshold value T2, the transmission of the channel selection re-execution instruction is stopped. Thus, a mobile terminal communicating with a radio base station which has no empty communication channel because of a high traffic quantity is made to communicate with another radio base station.

Also, a mobile communication system is described in Japanese Laid Open Patent Application (JP-A-Heisei 7-226973). In the reference, permission or inhibition of mode switching between one mode and another mode is set for each of zones which corresponds to at least one mode. An unnecessary mode switching is restrained in the mobile communication system in which communication is carried out using one selected from a plurality of modes.

Also, a communication channel switching system is described in Japanese Laid Open Patent Application (JP-A-Heisei 8-70479). In the reference, a control station (5) notifies a usable communication channel to a mobile station (1) via base station (2, 3). The mobile station monitors the present communication condition. When the communication condition is degraded, the mobile station independently switches to a new channel by which good communication condition is attained. The mobile station notifies the new channel to the control station (5) via the base station (2, 3).

Also, a communication restriction control system is described in Japanese Laid Open Patent Application (JP-A-Heisei 9-9340). In the reference, threshold values a' and b' are predetermined based on a use percentage of a communication channel and stored in a communication restriction control section (33). The communication restriction control section inputs a traffic quantity of a communication channel from a call control section (32) and calculates the use percentage. When the calculated use percentage exceeds the threshold value a', a notice a is sent out to carry out restriction to roaming subscribers such as call origination restriction. When the calculated use percentage exceeds the threshold value b', a notice b is sent out to carry out restriction to all subscribers such as call origination restriction.

Also, a method of implementing soft hand-off in a radio communication system is described in Japanese Laid Open Patent Application (JP-A-Heisei 10-145834). In the reference, a communication channel is provided between adjacent base stations to be logically separated from a mobile switching station. Traffic information is exchanged between the base stations via the communication channel. Thus, the soft hand-off by the base station can be realized.

SUMMARY OF THE INVENTION

Therefore, an object of the present invention is to provide a mobile communication system in which traffics are equalized between switching apparatus so that the communication quality can be improved.

In order to achieve an aspect of the present invention, a mobile communication system includes first and second switching apparatuses, an information channel provided between the first and second switching apparatuses, a plurality of base stations managed by each of the first and second switching apparatuses, and a mobile station. The mobile station can communicate with the first switching apparatus through one of the plurality of base stations managed by the first switching apparatus and with the second switching apparatus through one of the plurality of base stations managed by the second switching apparatus. The first and second switching apparatuses detect traffics therethrough as first and second traffics, respectively, and the second switching apparatus notifies the second traffic to the first switching apparatus via the information channel. The first switching apparatus controls the mobile station and the second switching apparatus based on the first and second traffics such that the mobile station which is currently communicating with the first switching apparatus communicates with the second switching apparatus.

The first switching apparatus may control the mobile station and the second switching apparatus based on the first and second traffics and first and second threshold values. In this case, the first switching apparatus compares the first traffic and the first threshold value, and the second traffic and the second threshold value. Then, the first switching apparatus controls the mobile station and the second switching apparatus when the first traffic is equal to or larger than the first threshold value and when the second traffic is smaller than the second threshold value. Also, the first switching apparatus continues the communication with the mobile station when the first traffic is smaller than the first threshold value or when the second traffic is larger than the second threshold value.

In the above, the first and second switching apparatuses may operate under a same communication system. Instead, the first and second switching apparatuses may operate under different communication systems from each other. In this case, it is preferable that the first and second switching apparatuses operate under two of a PHS communication system, a PDS communication system, and an automobile communication system.

The first switching apparatus may issue a switching request to the mobile station via the base station and to the second switching apparatus via the information channel, when the mobile station should communicate with the second switching apparatus. When a switching confirmation is received from the mobile station and the second switching apparatus, the first switching apparatus stops the communication with the mobile station.

In order to achieve another aspect of the present invention, a switching apparatus includes a traffic detecting unit and a traffic detecting unit. The traffic detecting unit detects a traffic through the switching apparatus and transmits the detected traffic to other switching apparatuses. The control unit issues a switching request to one of the other switching apparatuses and a mobile station communicating with the switching apparatus based on the detected traffic and a traffic received from the one switching apparatus. The control unit stops the communication with the mobile station when a switching confirmation is received from the mobile station and the one switching apparatus.

The control unit issues the switching request to the one switching apparatus and the mobile station based on the detected traffic and the received traffic and first and second threshold values such that the mobile station which is currently communicating with the switching apparatus communicates with the one switching apparatus. The first and second threshold values are allocated to the switching apparatus and the one switching apparatus. In this case, the control unit compares the first traffic and the first threshold value, and the second traffic and the second threshold value. Then, the control unit issues the switching request to the mobile station and the one switching apparatus when the first traffic is equal to or larger than the first threshold value and when the second traffic is smaller than the second threshold value. In this case, the switching apparatus continues the communication with the mobile station when the first traffic is smaller than the first threshold value or when the second traffic is larger than the second threshold value.

In order to achieve still another aspect of the present invention, a mobile terminal includes first and second communication radio sections corresponding to first and second communication systems, respectively, and a control unit. The control unit issues a switching confirmation via the first communication radio section when a switching request is received through the first communication radio section, and then starts a communication through the second communication radio section.

In order to achieve yet still another aspect of the present invention, a method of averaging traffics between a plurality of switching apparatuses, includes:

detecting traffics as first and second traffics by first and second switching apparatuses of the plurality of switching apparatuses, respectively;

notifying the second traffic from the second switching apparatus to the first switching apparatus;

issuing a switching request to the second switching apparatus and a mobile station currently communicating with the first switching apparatus, based on the first and second traffics;

stopping the communication with the mobile station in response to a switching confirmation from the mobile station and a switching confirmation from the second switching apparatus such that communication is carried out between the second switching apparatus and the mobile station.

The switching request may be issued to the second switching apparatus and the mobile station based on the first and second traffics and first and second threshold values. In this case, for the issuing the switching request, the first traffic and the first threshold value and the second traffic and the second threshold value are compared. The switching request is issued to the second switching apparatus and the mobile station based on the first and second traffics and first and second threshold values, when the first traffic is equal to or larger than the first threshold value and when the second traffic is smaller than the second threshold value. The issue of the switching request is stopped when the first traffic is smaller than the first threshold value or when the second traffic is larger than the second threshold value.

Also, the first and second switching apparatuses may operate under a same communication system. Instead, the first and second switching apparatuses may operate under different communication systems from each other. In this case, it is preferable that the first and second switching apparatuses operate under two of a PHS communication system, a PDS communication system, and an automobile communication system.

DESCRIPTION OF THE PREFERRED EMBODIMENTS

Hereinafter, a mobile communication system of the present invention will be described in detail with reference to the attached drawings.

Figure 1:
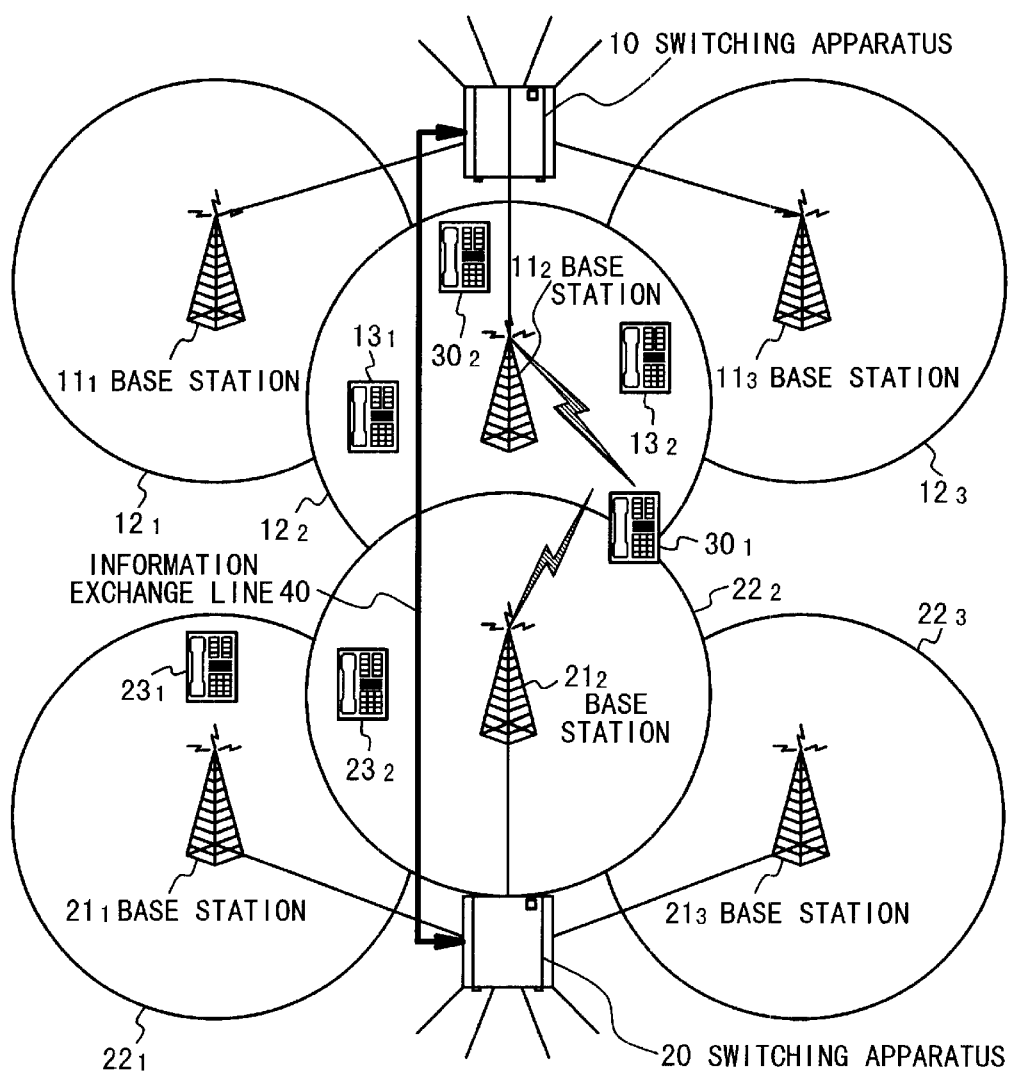
FIG. 1 is a diagram illustrating the structure of a mobile communication system according to an embodiment of the present invention.

FIG. 1 is a diagram illustrating the structure of the mobile communication system according to an embodiment of the present invention. It should be noted that a case where two kinds of mobile telephone systems such as an A telephone system and a B telephone system are provided to have an overlapping service area will be described below for simplification of the description. However, the mobile communication system to which the present invention is applied may be three kinds or more. Also, as the A telephone system and the B telephone system, various mobile communication systems can be used such as an automobile telephone system, a PDS system or a portable digital phone system, a PHS system or a personal handy phone system, a cordless telephone system, a train/ship/aircraft telephone system, and a satellite mobile communication system.

Referring to FIG. 1, the A telephone system is composed of a switching apparatus 10, base stations $11_1$ to $11_3$, radio communication apparatuses $13_1$ and $13_2$ as mobile stations.

The switching apparatus 10 controls the whole of A telephone system. The base stations $11_1$ to $11_3$ are connected with the switching apparatus 10. The base stations $11_1$ to $11_3$ transmit and receive radio waves to and from radio communication apparatuses which exist in zones $12_1$ to $12_3$ in a service area of the A telephone system. Thus, a radio communication is carried out between the radio communication apparatus and the switching apparatus via the base station. The radio communication apparatuses 13, and $13_2$ can transmit and receive the radio waves to and from only the base stations $11_1$, to $11_3$ of the A telephone system.

The B telephone system is composed of a switching apparatus 20, base stations $21_1$, to $21_3$, and radio communication apparatuses $23_1$, and $23_2$. The switching apparatus 20 controls the whole of B telephone system. The base stations $21_1$, to $21_3$ are connected with the switching apparatus 20. The base station $21_1$ to $21_3$ transmit and receive radio waves to and from the radio communication apparatuses which exist in zones $22_1$, to $22_3$ in a service area of the B telephone system. Thus, a radio communication is carried out between the radio communication apparatus and the switching apparatus 20 via the base station. The radio communication apparatuses $23_1$, and $23_2$ can transmit and receive the radio waves only to and from the base stations $21_1$, to $21_3$ of the B telephone system.

The dual band radio communication apparatuses $30_1$, and 322 can carry out radio communication with the switching apparatus 10 of the A telephone system and the switching apparatus 20 of the B telephone system. One of the switching apparatuses 10 and 20 to be communicated is determined based on traffic quantities, as described in detail later.

Also, an information exchange line 40 as a communication channel is operatively connected between the switching apparatus 10 and the switching apparatus 20. The traffic quantity data indicative of current traffics the A telephone system and B telephone system are exchanged through the information exchange line 40. It should be noted that it is possible to operatively connect between the switching apparatus 10 and the switching apparatus 20 by a radio channel.

Figure 2:
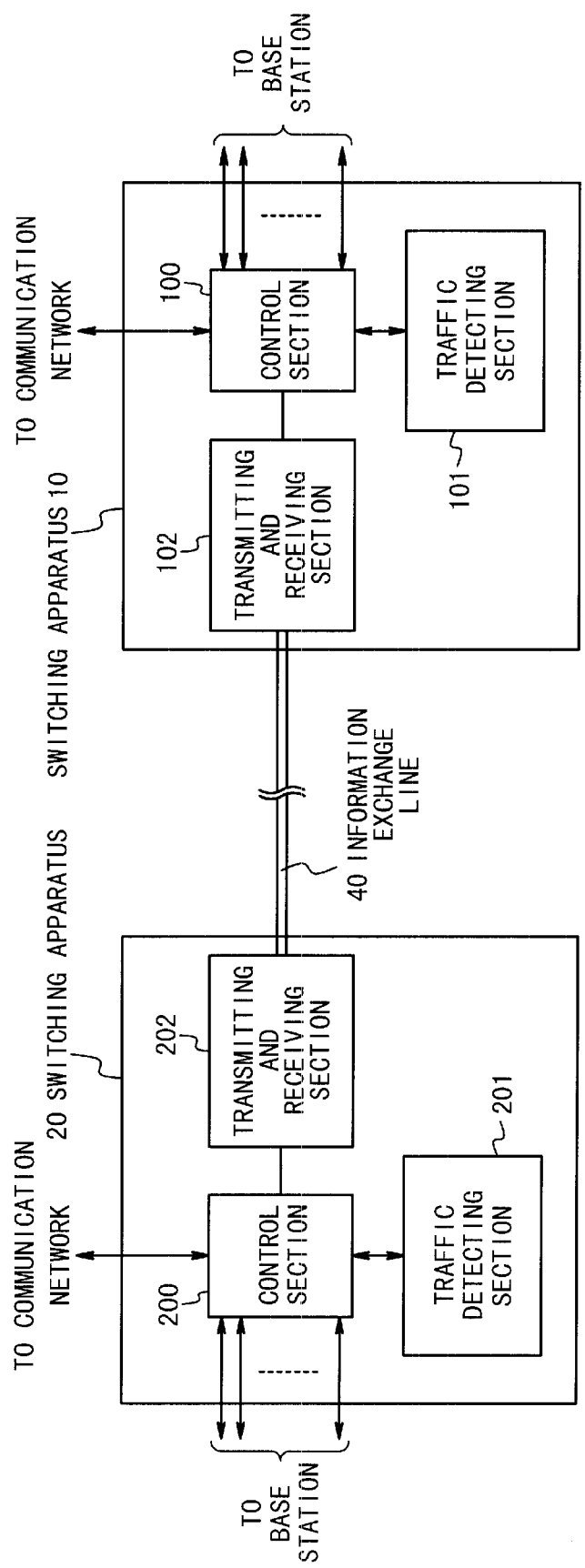
FIG. 2 is a block diagram illustrating the structure of a switching apparatus used in the mobile communication system according to the embodiment of the present invention.

Next, the structures of above-mentioned switching apparatuses 10 and 20 will be described with reference to the block diagram shown in FIG. 2.

The switching apparatus 10 of the A telephone system is composed of a control unit 100, a traffic detecting section 101 and a transmitting and receiving section 102. The control unit 100 may be composed of a computer to control the whole A telephone system or the whole of switching apparatus 10. The base stations $11_1$, to $11_3$ and a communication network are connected with the control unit 100. The control unit 100 sends out to the communication network, signals which are sent from the base stations 11₁ to 11₃ which have received radio waves from the radio communication apparatuses 13₁, and 13₂ and the dual band radio communication apparatuses 30₁, and 30₂. Also, the control unit 100 sends out signals from the communication network to the radio communication apparatuses 13₁, and 13₂ and the dual band radio communication apparatuses 30₁, and 30₂ through the base stations 11₁ to 11₃. In this manner, a user can communicate with the desired destination of using the A telephone system.

Also, the traffic detecting section 101 detects the current traffics of the base stations 11₁ to 11₃ which are under the control of the control unit 100. A traffic data indicative of the detected current traffics is possible to express a ratio (%) of the number of current communications to the number of maximum communications permitted to process in the A telephone system. When the traffic data is equal to 100%, the call origination and the call arrival are made to wait. The traffic data detected by the traffic detecting section 101 is supplied to the transmitting and receiving section 102 through the control unit 100.

The transmitting and receiving section 102 modulates and outputs the traffic data received from the control unit 100 to other switching apparatuses (the switching apparatus 20 in this example) through the information exchange line 40. Also, the transmitting and receiving section 102 demodulates and supplies the traffic data received from the other switching apparatuses through the information exchange line 40 to the control unit 100.

The switching apparatus 20 of the B telephone system is composed of a control unit 200, a traffic detecting section 201 and a transmitting and receiving section 202. The control unit 200 can be composed of a computer to control the whole of B telephone system or the whole switching apparatus 20.

The base stations 21₁ to 21₃ and the communication network are connected with the control unit 200. The control unit 200 receives the signals from the radio communication apparatuses 23₁ and 23₂ and the dual band radio communication apparatuses 30₁ and 30₂ through the base stations 21₁ to 21₃ to send out to the communication network. Also, the control unit 200 sends out the signals received from the communication network to the radio communication apparatuses 23₁ and 23₂ and the dual band radio communication apparatuses 30₁ and 30₂ through the base stations 21₁ to 21₃. In this way, the user can communicate with a desired destination using the B telephone system.

Also, the traffic detecting section 201 detects the current traffics of the base stations 21₁ to 21₃ under the control of the control unit 200. The traffic data indicative of the detected current traffics is possible to express a ratio (%) of the number of current communications in the B telephone system to the number of maximum communications permitted to process, like the above. The traffic data detected by the traffic detecting section 201 is supplied to the transmitting and receiving section 202 through the information exchange line 40.

The transmitting and receiving section 202 modulates and outputs the traffic data received from the control unit 200 to other switching apparatuses through the information exchange line 40. Also, the transmitting and receiving section 202 demodulates and supplies the traffic data received through the information exchange line 40 to the control unit 200.

Figure 3:
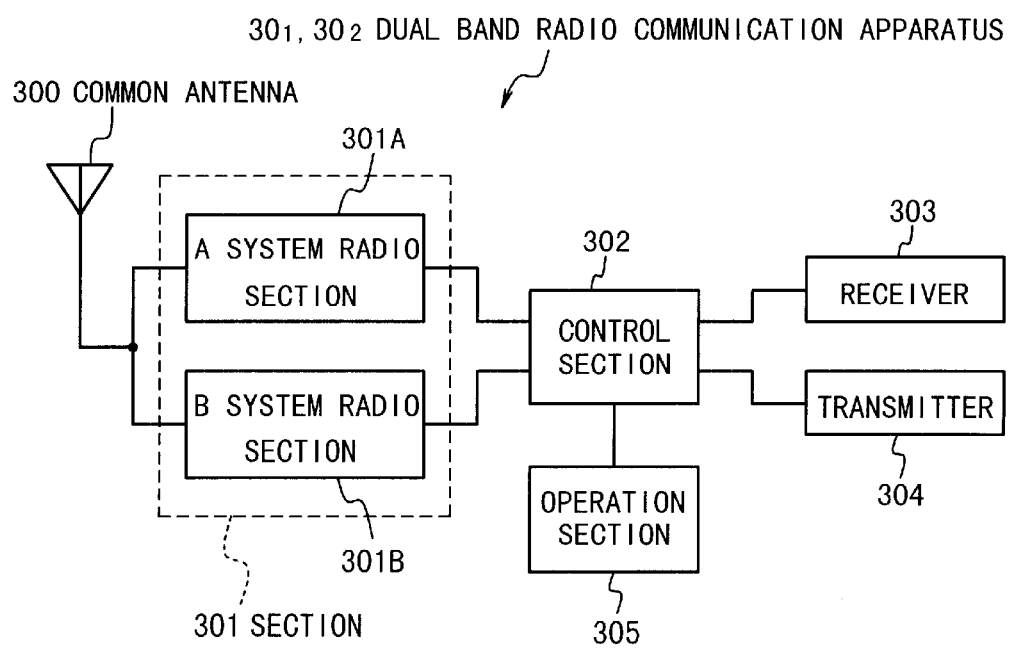
FIG. 3 is a block diagram illustrating the structure of a dual band radio communication apparatus as a mobile station used in the mobile communication system according to the embodiment of the present invention.

Next, the structures of the dual band radio communication apparatuses 30₁, and 30₂ will be described with reference to the block diagram shown in FIG. 3. The dual band radio communication apparatus is composed of a common antenna 300, a radio section 301, a control unit 302, a receiver 303, a transmitter 304 and an operation section 305.

The common antenna 300 converts a received radio wave into an electric signal to supply to the radio section 301. Also, the common antenna 300 converts the signal sent from the radio section 301 into a radio wave to radiate in the air.

The radio section 301 is composed of an A telephone system radio section 301A and a B telephone system radio section 301B. The A telephone system radio section 301A and the B telephone system radio section 301B demodulate a signal component taken out from the radio frequency band signal which has been received by the common antenna 300, respectively. A sound data and a control data obtained through the demodulation are supplied to the control unit 302. The data indicative of "system switching request" to be mentioned later is contained in the control data.

Also, the A telephone system radio section 301A and the B telephone system radio section 301B modulate and supply a sound data and a control data supplied from the control unit 302 to the common antenna 300. The signal indicative of "system switching confirmation" to be mentioned later is contained in the modulated control data. Which of the A telephone system radio section 301A and the B telephone system radio section 301B is used for the above mentioned modulation and demodulation is determined based on the system switching process, to be mentioned later.

The control unit 302 controls the whole of dual band radio communication apparatus. The control unit 302 performs the system switching control (to be mentioned later in detail) such that the dual band radio communication apparatus operates under the A telephone system or the B telephone system. Also, the control unit 302 controls the receiver 303 to generate sound by supplying the sound data received from the radio section 301. Also, the control unit 302 supplies the sound data from the transmitter 304 to the radio section 301. Moreover, the control unit 302 controls the operation section 305.

The operation section 305 contains switches and a display unit (both not shown). The switches are used for input of a telephone number, setting of various modes, and registration of various data, for example. Also, the display unit displays messages such as date, time, already registered data, and radio wave state with character or a picture. A data inputted using the switches of the operation section 305 is supplied to the control unit 302. Also, the display data is supplied to the display unit of the operation section 305 from the control unit 302.

Next, the system switching process in the mobile communication system structured as mentioned above will be described with reference to the flow charts of FIG. 4 and FIG. 5.

In the following description, it is supposed that the dual band radio communication apparatus 30₁ is set to operate under the A telephone system. Also, it is supposed that the dual band radio communication apparatus 30₁ notifies that it is possible to communicate with both of the A telephone system and the B telephone system, to the switching apparatus 10 through the base station 11₂, in the start of communication. As a result, information indicative of the notice is stored in a storage unit (not shown) of the switching apparatus 10.

Figure 4:
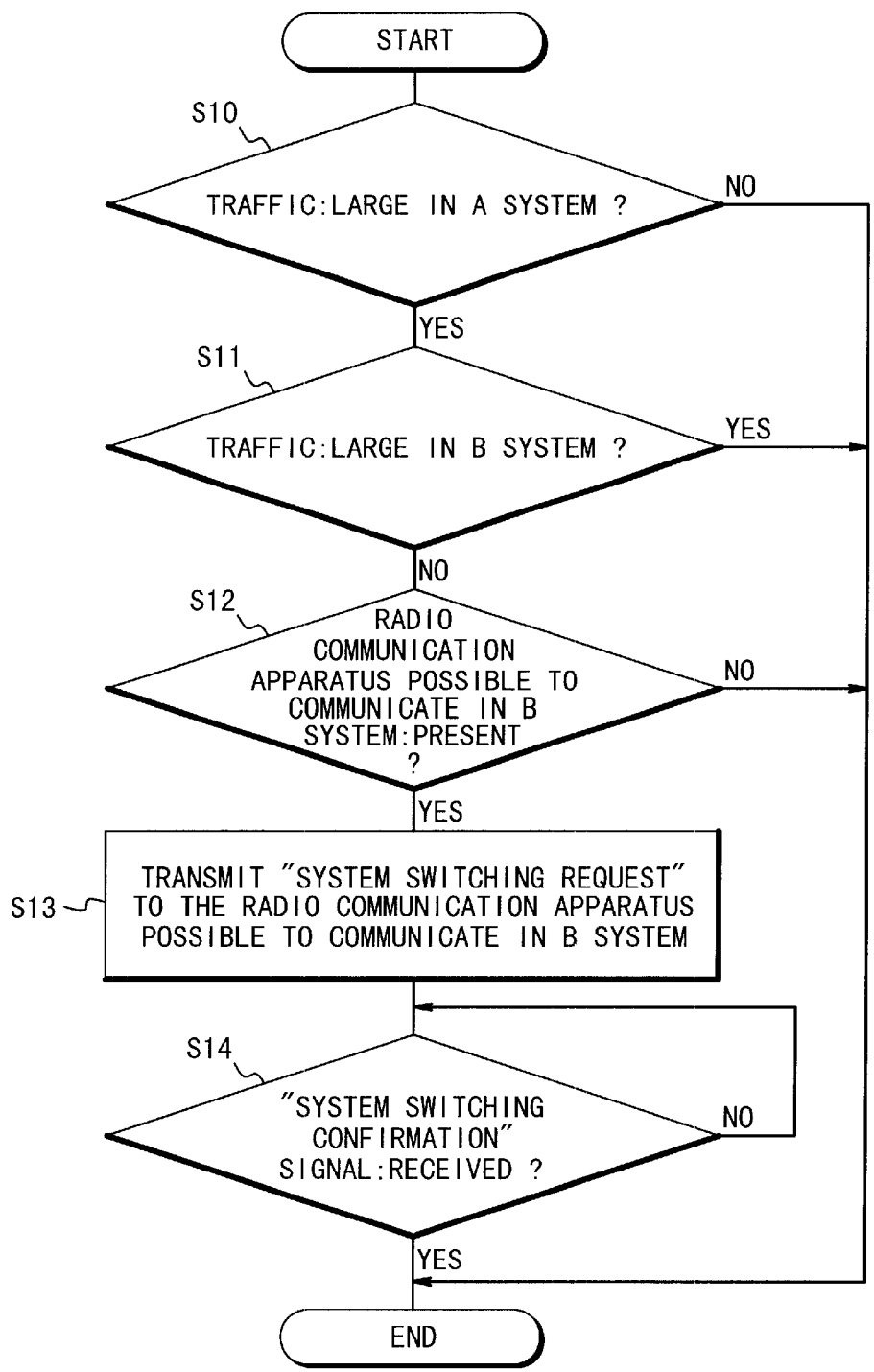
FIG. 4 is a flow chart illustrating a system switching process in the switching apparatus shown in FIG. 2.
Figure 5:
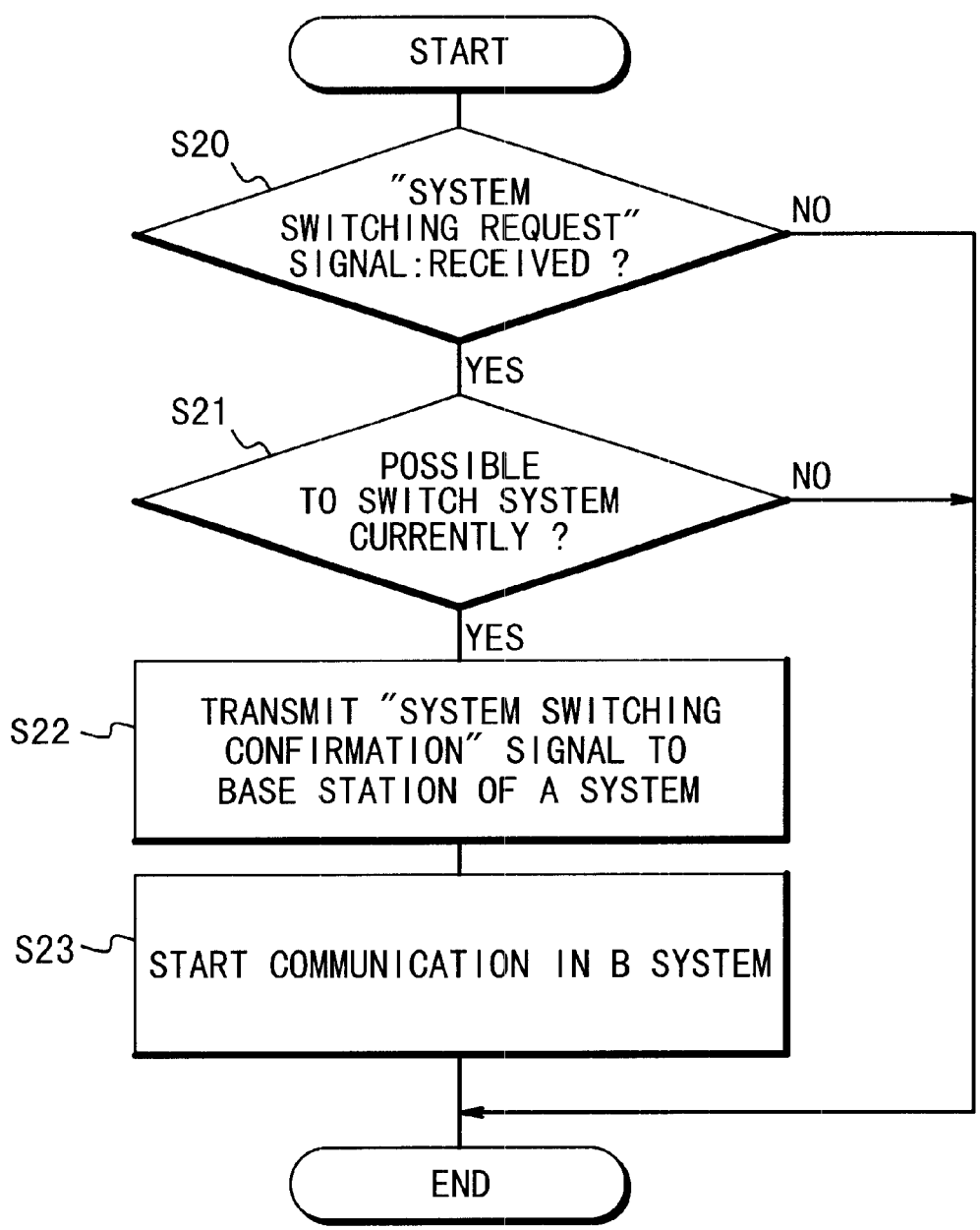
FIG. 5 is a flow chart illustrating a system switching process in the dual band radio communication apparatus shown in FIG. 3.

FIG. 4 is a flow chart illustrating the system switching process which is carried out by the control unit 100 of the switching apparatus 10 of the A telephone system. The system switching process routine is called at every predetermined time period from a main processing routine to control the whole of switching apparatus 10. Therefore, the system switching process routine is executed at every predetermined time period.

In the system switching process, whether or not the traffic of the A telephone system is large is first determined (Step S10). This process is carried out by determining whether or not the traffic data detected by the traffic detecting section 101 is equal to or larger than a predetermined value α. Here, as the predetermined value α, an optional value can be used in consideration of the waiting time to be permissible in the A telephone system for call origination and call arrival. The function to always monitor the traffic of the A telephone system by the switching apparatus 10 of the A telephone system is realized through the processing of the step S10.

When it is determined at the step S10 that the traffic of the A telephone system is not larger than the predetermined value α, it is recognized that the load of the switching apparatus 10 is light. The process is ended without being carried out the subsequent system switching process. In this case, the dual band radio communication apparatus continues the communication under the A telephone system.

On the other hand, when it is determined at the above step S10 that the traffic of the A telephone system is larger than the predetermined value α, it is recognized that the load of the switching apparatus 10 is heavy. Next, it is determined whether or not the traffic of the B telephone system is large (Step S11). This process carried out by determining whether or not the traffic data sent from the B telephone system to the transmitting and receiving section 102 through the information exchange line 40 is equal to or larger than a predetermined value β. Here, as the predetermined value beta, an optional value can be used in consideration of the waiting times to be permissible in the B telephone system for the call origination and call arrival. The function to monitor the traffic of the B telephone system by the switching apparatus 10 of the A telephone system when the traffic of the A telephone system is large is realized through the process of the step S11.

When it is determined at the step S11 that the traffic of the B telephone system is equal to or larger than the predetermined value β, it is recognized that the loads of both of the switching apparatus 10 and the switching apparatus 20 are heavy. As a result, the system switching process is ended without carrying out it. In this case, the dual band radio communication apparatus continues the communication under the A telephone system.

On the other hand, when it is determined at the above step S11 that the traffic of the B telephone system is not larger than the predetermined value β, it is recognized that the load of the switching apparatus 20 is light. Next, it is determined whether a radio communication apparatus possible to communicate using the B telephone system, i.e., any dual band radio communication apparatus exists (Step S12). This is carried out by referring to the information indicating whether the radio communication apparatus is possible to communicate using both of the A telephone system and the B telephone system and stored in the storage of switching apparatus 10 in the start of the communication.

When it is determined at the step S12 that the dual band radio communication apparatus possible to communicate using the B telephone system does not exist, the subsequent system switching process is ended with no further operation. On the other hand, when it is determined that the dual band radio communication apparatus possible to communicate under the B telephone system exists, a "system switching request" is transmitted to the dual band radio communication apparatus $30_1$ possible to communicate using the B telephone system (Step S13). At the same time, the system switching request is sent from the switching apparatus 10 to the switching apparatus 20 through the information exchange line 40. This is attained by producing the data indicating the system switching request by the control unit 100 of the A telephone system and by transmitting the data to the dual band radio communication apparatus 301 through the base station 112. It should be noted that the switching apparatus 10 of the A telephone system always grasps that the dual band radio communication apparatus 301 exists in the zone of the base station $21_2$.

Next, it is determined whether or not a "system switching confirmation" is received from both of the dual band radio communication apparatus 301 and the switching apparatus 20 (Step S14). When it is determined that the signal indicating a system switching confirmation is not received from one of :the both, the control waits the reception of the signal while the step S14 is repeatedly executed. When it is determined that the signal indicating the system switching confirmation is received in the repetitive process, the system switching process is ended. After that, the dual band radio communication apparatus 301 operates using the B telephone system. It should be noted that the above mentioned system switching process is carried out for the A telephone system. However, the same system switching process can be carried out in the switching apparatus 20 of the B telephone system.

Next, the system switching process which is carried out in the control unit 302 of the dual band radio communication apparatus will be described with reference to the flow chart shown in FIG. 5. A telephone system switching process routine is called at ever predetermined time period from a main processing routine so as to control the whole of dual band radio communication apparatus. Therefore, the system switching process is executed at every predetermined time period.

In the system switching process, it is determined whether or not the signal "system switching request" is received (Step S20). This is carried out by determining whether the control data indicating the system switching request is contained in the data which is obtained by receiving the radio wave by the common antenna 300 and by demodulating the received radio wave by the radio section 301. Because the system switching process routine is executed at every predetermined time period, the dual band radio communication apparatus always monitors whether the "system switching request" is received.

When it is determined at the step S20 that the "system switching request" is not received, the system switching process is ended with no operation. On the other hand, when it is determined that the "system switching request" is received, it is determined whether or not the dual band radio communication apparatus is in the state in which the system can be switched at present (Step S21). When it is determined that the dual band radio communication apparatus is not in the state which the system can be switched, the system switching process is ended with no further operation.

On the other hand, when it is determined at the above step S21 that the dual band radio communication apparatus is in the state in which the system can be switched, the signal indicating the "system switching confirmation" is sent out to the switching apparatus 10 of the A telephone system through the base station $11_2$ (Step S22). That is, the control unit 302 generates and supplies the data indicating the system switching confirmation to the radio section 301. The radio section 301 modulates and supplies the data indicating the system switching confirmation to the common antenna 300. In this way, the data indicating the system switching confirmation is transmitted as a radio wave from the common antenna 300 to the base station $11_2$.

Next, the communication is started using the B telephone system (Step S23). That is, the B telephone system radio section 301B is made active and the A telephone system radio section 301A is made inactive. In this way, the communication with the base station $11_2$ which sends and receives the radio wave of the A telephone system is stopped, and the communication with the base station $21_2$ which sends and receives the radio wave of the B telephone system is started.

In the above description, the switching apparatus 10 operates under the A telephone system and the switching apparatus 20 operates under the B telephone system. Also, the radio communication apparatus 301 is of a dual band type. However, the present invention can be applied even in a case where the switching apparatuses 10 and 20 operate under the same telephone system. In this case, the radio communication system may adopt the above telephone system. Also, a "switching request" is sent to the radio communication apparatus and a "switching confirmation" is received from the radio communication apparatus.

As described above, according to the mobile communication system according to the present invention, when the load becomes heavy in one of the mobile communication systems, the operation mode of the dual band radio communication apparatus is switched. That is, the operation mode of the dual band radio communication apparatus is switched in response to a control signal from the base station such that the communication is carried out using the other telephone system. As a result, the traffic of the telephone system with the large load is reduced so that the traffics of the plurality of telephone system are equalized. In this way, it is possible to prevent the degradation of the communication quality which is caused by the large traffic.

Also, the mobile communication system is switched under the control of the base station so that it is possible to switch the telephone system in the dual band radio communication apparatus in consideration of the traffic of the telephone system. Therefore, the reliability of the mobile communication system can be increased.

What is claimed is:

1. A mobile communication system comprising:
    first and second switching apparatuses;
    an information channel provided between said first and second switching apparatuses;
    a plurality of base stations managed by each of said first and second switching apparatuses; and
    a mobile station communicatable with said first switching apparatus through one of said plurality of base stations managed by said first switching apparatus and with said second switching apparatus through one of said plurality of base stations managed by said second switching apparatus,
    wherein said first and second switching apparatuses detect traffics therethrough as first and second traffics, respectively, and said second switching apparatus notifies said second traffic to said first switching apparatus via said information channel, and
    wherein said first switching apparatus controls said mobile station and said second switching apparatus based on said first and second traffics such that said mobile station which is currently communicating with said first switching apparatus communicates with said second switching apparatus.

2. A mobile communication system according to claim 1, wherein said first switching apparatus controls said mobile station and said second switching apparatus based on said first and second traffics and first and second threshold values such that said mobile station which is currently communicating with said first switching apparatus communicates with said second switching apparatus, said first and second threshold values being allocated to said first and second switching apparatus.

3. A mobile communication system according to claim 2, wherein said first switching apparatus compares said first traffic and said first threshold value, and said second traffic and said second threshold value, and said first switching apparatus controls said mobile station and said second switching apparatus when said first traffic is equal to or larger than said first threshold value and when said second traffic is smaller than said second threshold value.

4. A mobile communication system according to claim 3, wherein said first switching apparatus continues the communication with said mobile station when said first traffic is smaller than said first threshold value or when said second traffic is larger than said second threshold value.

5. A mobile communication system according to claim 1, wherein said first and second switching apparatuses operate under a same communication system.

6. A mobile communication system according to claim 1, wherein said first and second switching apparatuses operate under different communication systems from each other.

7. A mobile communication system according to claim 6, wherein said first and second switching apparatuses operate under two of a PHS communication system, a PDS communication system, and an automobile communication system.

8. A mobile communication system according to claim 1, wherein said first switching apparatus issues a switching request to said mobile station via said base station and to said second switching apparatus via said information channel, when said mobile station should communicate with said second switching apparatus, and stops the communication with said mobile station when a switching confirmation is received from said mobile station and said second switching apparatus.

9. A switching apparatus comprising:
    a traffic detecting unit detecting a traffic through said switching-apparatus and transmitting said detected traffic to other switching apparatuses; and
    a control unit issuing a switching request to one of said other switching apparatuses and a mobile station communicating with said switching apparatus based on said detected traffic and a traffic received from said one switching apparatus, and stopping the communication with said mobile station when a switching confirmation-is received from said mobile station and said one switching apparatus.

10. A switching apparatus according to claim 9, wherein said control unit issues said switching request to said one switching apparatus and said mobile station based on said detected traffic and said received traffic and first and second threshold values such that said mobile station which is currently communicating with said switching apparatus communicates with said one switching apparatus, said first and second threshold values being allocated to said switching apparatus and said one switching apparatus.

11. A switching apparatus according to claim 10, wherein said control unit compares said first traffic and said first threshold value, and said second traffic and said second threshold value, and issues said switching request to said mobile station and said one switching apparatus when said first traffic is equal to or larger than said first threshold value and when said second traffic is smaller than said second threshold value.

12. A switching apparatus according to claim 11, wherein said switching apparatus continues the communication with said mobile station when said first traffic is smaller than said first threshold value or when said second traffic is larger than said second threshold value.

13. A mobile terminal comprising:

first and second communication radio sections corresponding to first and second communication systems, respectively; and a control unit issuing a switching confirmation via said first communication radio section when a switching request is received through said first communication radio section, and starting a communication through said second communication radio section, p1 wherein said first communication system has a first traffic detected by a first switching apparatus, and said second communication system has a second traffic detected by a second switching apparatus, and wherein said switching request is sent from said first switching apparatus to said mobile terminal based on said first and second traffics.

14. A method of averaging traffics between a plurality of switching apparatuses, comprising:

detecting traffics as first and second traffics by first and second switching apparatuses of said plurality of switching:apparatuses, respectively;

notifying said second traffic from said second switching apparatus to said first switching apparatus;

issuing a switching request to said second switching apparatus and a mobile station currently communicating with said first switching apparatus, based on said first and second traffics;

stopping the communication with said mobile station in response to a switching confirmation from said mobile station and a switching confirmation from said second switching apparatus such that communication is carried out between said second switching apparatus and said mobile station.

15. A method according to claim 14, wherein said issuing includes:

issuing said switching request to said second switching apparatus and said mobile station based on said first and second traffics and first and second threshold values.

16. A method according to claim 15, wherein said issuing includes:

comparing said first traffic and said first threshold value, and said second traffic and said second threshold value;

issuing said switching request to said second switching apparatus and said mobile station based on said first and second traffics and first and second threshold values, when said first traffic is equal to or larger than said first threshold value and when said second traffic is smaller than said second threshold value.

17. A method according to claim 16, further comprising stopping the issue of said switching request when said first traffic is smaller than said first threshold value or when said second traffic is larger than said second threshold value.

18. A method according to claim 14, wherein said first and second switching apparatuses operate under a same communication system.

19. A method according to claim 14, wherein said first and second switching apparatuses operate under different communication systems from each other.

20. A method according to claim 19, wherein said first and second switching apparatuses operate under two of a PHS communication system, a PDS communication system, and an automobile communication system.

* * * * *